UNITED STATES PATENT OFFICE.

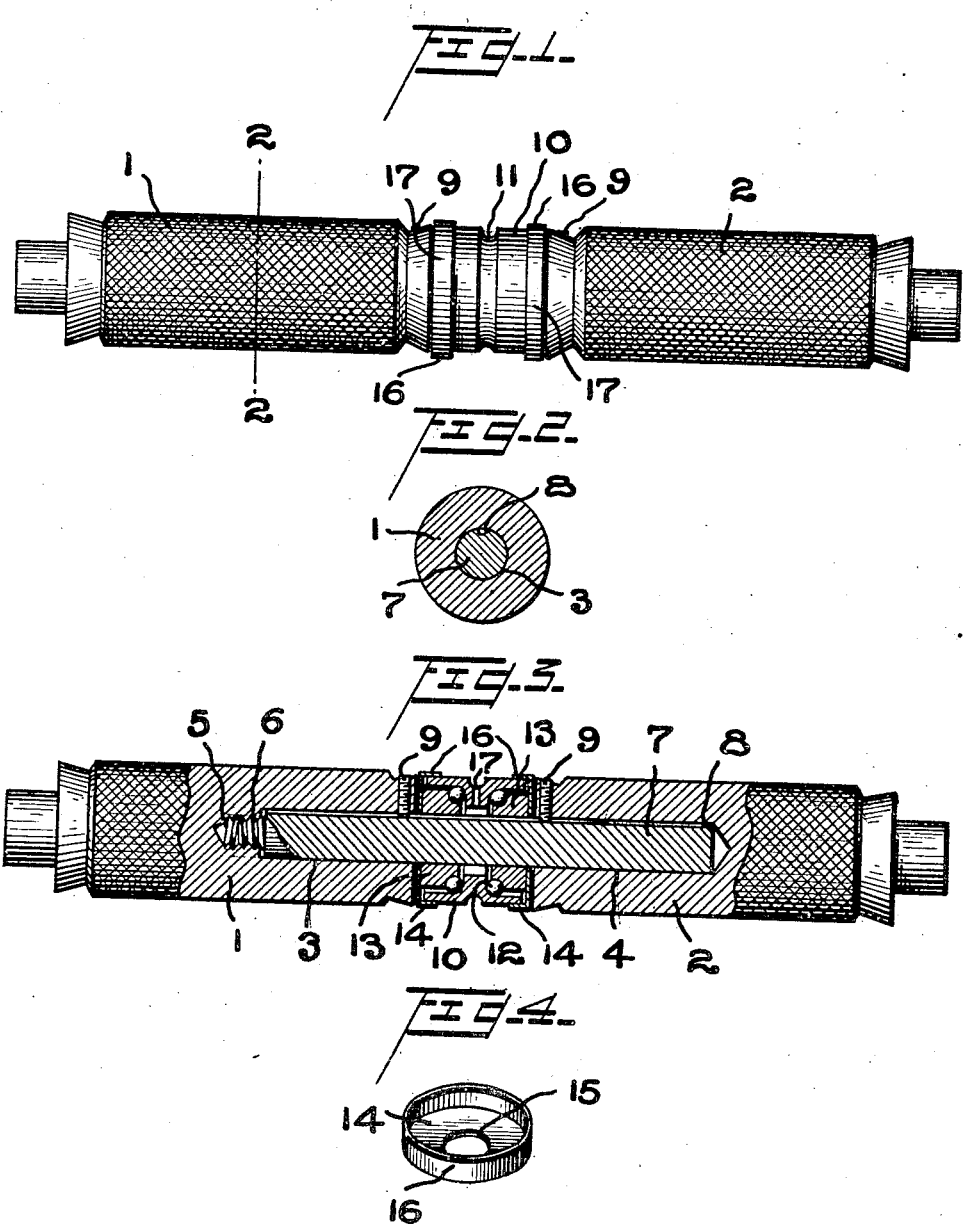

CARL OTTO CHRISTIAN PACK, OF HIGHLAND PARK, NEW JERSEY.

ROLL.

1,104,270.   Specification of Letters Patent.   Patented July 21, 1914.

Application filed March 13, 1914. Serial No. 824,362.

*To all whom it may concern:*

Be it known that I, CARL OTTO CHRISTIAN PACK, a citizen of the United States, residing at Highland Park, in the county of Middlesex and State of New Jersey, have invented certain new and useful Improvements in Rolls, of which the following is a specification.

My invention relates to improvements in rolls, and more particularly to an improved top roll for spinning and preparatory cotton machinery, the object of the invention being to provide at the center of the roll an improved ball bearing having improved means for adjusting the roll sections on the arbor, and thereby adjusting the bearing to take up wear of the balls or the runways, and provide improved means between the roll sections and ball bearing for preventing the passage of cotton or other foreign matter from entering the bearing, and will confine the lubricant within the bearing to prevent its contact with the thread.

A further object is to provide a roll of the character stated which will run true under any pressure, and which will reduce friction to a minimum so as to efficiently perform the functions for which it is intended.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in cross section on the line 2—2 of Fig. 1. Fig. 3 is a view partly in longitudinal section and partly in elevation, and Fig. 4 is a perspective view of one of the cups 14.

1 and 2 represent roll sections which are illustrated as having milled surfaces, but may be otherwise formed to frictionally engage the thread against which they bear.

The sections 1 and 2 are provided in their inner ends with longitudinal cylindrical sockets 3 and 4 respectively, and at the inner end of the socket 3 in section 1, a screw-threaded pocket 5 is provided to receive a screw-threaded lug 6 on the end of an arbor 7 for a purpose which will be hereinafter explained.

The arbor 7 is of a diameter to snugly fit the sockets 3 and 4, and is provided with a longitudinal groove 8 which performs the double function of permitting the arbor to be readily projected into the sockets without the formation of air pockets in the ends of the sockets and also operates to receive the inner ends of jam screws 9 which are projected through the roll sections 1 and 2, and securely hold the sections against turning movement on the arbor.

Between the roll sections 1 and 2, and supported to turn on arbor 7, is my improved ball bearing which consists of a cylindrical casing 10 having an annular groove 11 to receive a suitable pressure member as is common with devices of this kind. The casing 10 has cupped ends forming runways for balls 12, and cones 13 are positioned in the cupped ends of the casing and provide other runways for the balls 12.

The cones 13 fit snugly upon the arbor 7, and when the sections 1 and 2 are pressed toward each other, the cones 13 are forced into the casing and adjust the pressure against the balls. This adjustment is accomplished by holding section 2 and turning section 1, which owing to the screw-threaded lug 6 in the pocket 5, will adjust the section 1 toward the section 2, thereby pressing both cones 13 toward each other and tightening the ball bearing.

Cups 14 are located between the sections 1 and 2, and the ball bearing, and have central openings 15 for the accommodation of the arbor 7. The outer flanged edges 16 of the cups project over the casing 10 and effectually exclude cotton, dirt, lint, or any other foreign matter from the bearing, and also prevent the passage of lubricant from the bearing to the outer surface of the roll.

I have provided a lubricant opening 17 in the casing 10, through which lubricant may be supplied to the bearing, but a bearing of this kind requires but a very small quantity of lubricant as the roll runs freely on its ball bearings.

It will be noted that with my improvements the bearing can be adjusted without dismantling any part of the roll. In other words, the screw 9 of section 1 can be loosened, and then section 1 turned, and after the proper adjustment of the bearing is had, the screw 9 can be returned to place.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A roll of the character described, comprising two sections having longitudinal cylindrical sockets in their adjacent ends, a cylindrical arbor snugly fitting the said recesses, jam screws in the sections engaging the arbor, a bearing located between the sections and around the arbor, said bearing comprising an outer casing having pockets in its opposite ends, cones fitting the arbor and located in the pockets, balls between the cones and the inner ends of the pockets, and cups located between the sections and the cones and having flanges at their outer edges overlapping the casing, substantially as described.

2. A roll of the character described, comprising two sections having longitudinal cylindrical sockets in their adjacent ends, one member at the inner end of its socket having a screw-threaded pocket, a cylindrical arbor snugly fitting the said recesses and having a screw-threaded lug at one end engaging the threads in the pocket, jam screws in the sections engaging the arbor, a bearing located between the sections and around the arbor, said bearing comprising an outer casing having pockets in its opposite ends, cones fitting the arbor and located in the pockets, balls between the cones and the inner ends of the pockets, said cones adjustable in the pockets by the turning of one roll section to adjust the same on the threaded lug, and cups located between the sections and the cones and having flanges at their outer edges overlapping the casing, substantially as described.

In testimony whereof I have signed my name to this specification in the presence of two subscribing witnesses.

CARL OTTO CHRISTIAN PACK.

Witnesses:
C. H. CRAMER,
GEORGE S. EDGAR.